US012197172B2

(12) United States Patent
Nakazawa et al.

(10) Patent No.: US 12,197,172 B2
(45) Date of Patent: Jan. 14, 2025

(54) WATCH

(71) Applicant: SEIKO EPSON CORPORATION, Tokyo (JP)

(72) Inventors: Toshinori Nakazawa, Matsumoto (JP); Hironori Hasei, Azumino (JP)

(73) Assignee: SEIKO EPSON CORPORATION (JP)

( * ) Notice: Subject to any disclaimer, the term of this patent is extended or adjusted under 35 U.S.C. 154(b) by 330 days.

(21) Appl. No.: 17/889,437

(22) Filed: Aug. 17, 2022

(65) Prior Publication Data

US 2023/0057778 A1 Feb. 23, 2023

(30) Foreign Application Priority Data

Aug. 18, 2021 (JP) ................................ 2021-133204

(51) Int. Cl.
*G04B 19/04* (2006.01)
*G04C 10/04* (2006.01)

(52) U.S. Cl.
CPC ........... *G04B 19/046* (2013.01); *G04C 10/04* (2013.01)

(58) Field of Classification Search
CPC .... G04B 19/046; G04B 19/048; G04B 19/08; G04B 19/10; G04B 19/28; G04C 10/04
See application file for complete search history.

(56) References Cited

U.S. PATENT DOCUMENTS

| | | | | |
|---|---|---|---|---|
| 2009/0274010 | A1* | 11/2009 | Vuilleumier | G04B 19/268 368/18 |
| 2016/0357150 | A1* | 12/2016 | Enta | G04B 19/046 |
| 2018/0120771 | A1* | 5/2018 | Feyer | G04B 19/24306 |
| 2020/0103828 | A1* | 4/2020 | Okamura | G04C 10/04 |
| 2020/0387116 | A1 | 12/2020 | Yamaguchi | |

FOREIGN PATENT DOCUMENTS

| | | | |
|---|---|---|---|
| FR | 321499 | A | 1/1903 |
| JP | 2007-147432 | A | 6/2007 |
| JP | 2020-201064 | A | 12/2020 |

* cited by examiner

*Primary Examiner* — Edwin A. Leon
*Assistant Examiner* — Jason M Collins
(74) *Attorney, Agent, or Firm* — Harness, Dickey & Pierce, P.L.C.

(57) ABSTRACT

A watch includes an hour hand and a minute hand, a dial including a plurality of time graduations indicating time by being pointed by the hour hand and the minute hand, and a dial plate including a graduation for predetermined information different from the time, and supported by a rotary shaft, wherein in plan view from a normal direction of the dial, the rotary shaft overlaps with a pointing graduation, which is one of the time graduations, and the predetermined information is indicated by the graduation of the dial plate in an extension direction of the pointing graduation.

8 Claims, 5 Drawing Sheets

WATCH

The present application is based on, and claims priority from JP Application Serial Number 2021-133204, filed Aug. 18, 2021, the disclosure of which is hereby incorporated by reference herein in its entirety.

BACKGROUND

1. Technical Field

The present disclosure relates to a watch.

2. Related Art

In the past, a watch has been known that includes a power reserve display displaying drivable time of the watch. For example, JP 2007-147432 A discloses a mechanical wrist-watch including a fan-shaped power reserve display unit at a part of a dial. Specifically, as illustrated in FIG. 2 of JP 2007-147432 A, the fan-shaped power reserve display unit was provided between a 2 o'clock direction and a 3 o'clock direction of the dial.

In addition, the power reserve display unit was used not only in a mechanical watch using a power spring, but also in watches such as a watch that stores electric power generated by rotation of a rotary weight, and electrically oscillates and drives an oscillator, and a watch that stores electric power charged by a solar cell, and electrically oscillates and drives an oscillator.

However, in the watch of JP 2007-147432 A, there was a problem that it was difficult to recognize time because respective time graduations at 2 o'clock and 3 o'clock positions were absent due to presence of the power reserve display unit.

In other words, there has been a need for a watch that includes a power reserve display and with which it is easy to recognize time.

SUMMARY

A watch according to an aspect of the present application includes an hour hand and a minute hand, a dial including a plurality of time graduations indicating time by being pointed by the hour hand and the minute hand, and a dial plate including a graduation for predetermined information different from the time, and supported by a rotary shaft, wherein in plan view from a normal direction of the dial, the rotary shaft overlaps with a pointing graduation, which is one of the time graduations, and the predetermined information is indicated by the graduation of the dial plate in an extension direction of the pointing graduation.

DESCRIPTION OF EXEMPLARY EMBODIMENTS

Exemplary Embodiment 1

Overview of Watch

Figure 1:
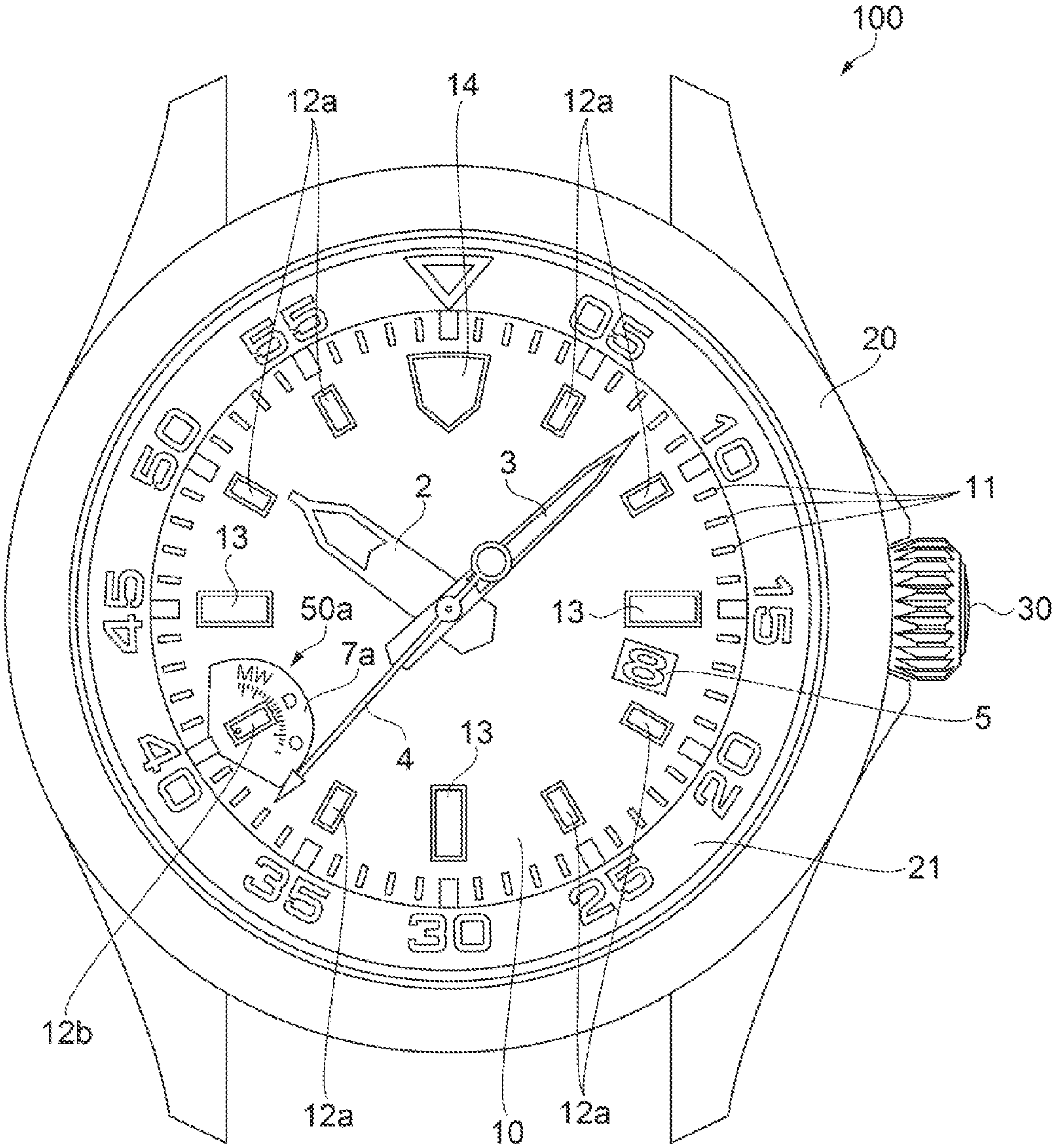
FIG. 1 is a plan view of a watch according to Exemplary Embodiment 1.

FIG. 1 is a plan view of a watch according to the present exemplary embodiment, viewed from front.

A watch 100 of the present exemplary embodiment is an analog wristwatch including a waterproof function, and is a so-called diver's watch.

The watch 100 is an electronic mechanical watch that has a rotary weight (not illustrated) built-in, charges electric power generated by rotation of the rotary weight to an electric condenser such as a capacitor to use as driving power, generates a reference clock in an oscillation circuit including an oscillator such as a crystal oscillator, and drives a hand based on the reference clock. The watch 100 includes the power reserve display unit 50*a*, and shows drivable time until the watch stops while the watch 100 is left alone. In a suitable example, the watch 100 has drive performance of about one month in a state of being left alone, when fully charged.

Note that, the present disclosure is not limited to an electronic mechanical watch that uses a rotary weight as a power source to generate electricity for driving, it is sufficient to use a watch including the power reserve display unit 50*a*, or for example, a watch that generates electricity for driving using a power spring or the like as a power source may be used, a watch that generates electricity for driving by applying stress to a piezoelectric element, a watch that generates electricity for driving by utilizing an electrostatic induction phenomenon, or a watch including a solar cell may be used. Alternatively, a mechanical watch may be used.

The watch 100 is configured with a case body 20, a dial 10, a bezel 21, a crown 30, and the like. Note that, a rear face of the case body 20 is provided with a case back, but illustration is omitted.

The case body 20 is a case, and is formed of titanium in the suitable example. Note that, the material is not limited to titanium, and it is sufficient to use a hard material, or for example, metal such as stainless steel or a ceramic may be used.

The dial 10 is a watch dial having a circular shape, and an insertion hole (not illustrated) through which a hand shaft passes is provided in a center thereof. Note that, the shape of the dial 10 is not limited to a circular shape, and it is sufficient to use a shape in accordance with a design, or for example, an ellipse may be used, or a polygon such as a quadrangular shape may be used. An hour hand 2, a minute hand 3, and a seconds hand 4 are mounted to the hand shaft inserted through the insertion hole of the dial 10. The hour hand 2 indicates hours, the minute hand 3 indicates seconds, and the seconds hand 4 indicates seconds.

The dial 10 is provided with a date window 5, a second graduation 11, an time graduation 12, an time graduation 13, an time graduation 14, a power reserve display unit 50*a*, and the like. In other words, the dial 10 has a plurality of the time graduations indicating time by being pointed by the hour hand 2 and the minute hand 3.

The date window 5 is a window frame for showing date provided in a vicinity of a 3.5 o'clock position, and a date is shown therein. The second graduation 11 is a second graduation provided at an outermost periphery of the dial.

The time graduations 12 are hour graduations, and are classified into an time graduation 12*a* and an time graduation 12*b*. The time graduation 12*a* is provided inside the second graduation 11, and is arranged at each of 1, 2, 4, 5, 7, 10, and 11 o'clock positions, in the suitable example.

The time graduation 12*b* is a pointing graduation, and is arranged at an 8 o'clock position inside the second graduation 11. Each of the time graduation 12*a* and the time graduation 12*b* is a bar index having a rectangular shape, the same shape and size. Note that, the time graduation 12, the time graduation 13, and the time graduation 14 are also referred to as hour characters, or hour markers.

The time graduation 13 is an hour graduation that is one size larger than the time graduation 12, and is arranged at each of 3, 6, and 9 o'clock positions in the suitable example. In other words, the time graduation 12*b* is planarly rectangular, and each of another time graduation 12*a* and the time graduation 13 also has the same shape as that of the time graduation 12*b*.

The time graduation 14 is an hour graduation arranged at a 12 o'clock position, has a pentagonal shape, and has a larger size than that of the time graduation 13 in the suitable example.

In this way, there are variations in size and shape of similar time graduations, based on a design concept for improving visibility in a dark environment such as under water. Specifically, the time graduation 14 at the 12 o'clock position is made greatest in order to clarify an orientation of the watch 100, and the shape is also different from those of the other time graduations. Also, by increasing the size of each of the time graduation 13 at the 6 o'clock position in an extension direction of 12 o'clock, and the time graduations 13 at the respective 3 o'clock and 9 o'clock positions in a direction intersecting the extension direction, time is easily recognized. In addition, in order to improve visibility in a dark environment, a fluorescent paint is applied to a surface of each of the time graduation 12, the time graduation 13, and the time graduation 14. Similarly, a fluorescent paint is also applied to a surface of each of the hour hand 2, the minute hand 3, and the seconds hand 4.

The power reserve display unit 50*a* is provided at the 8 o'clock position, and is configured with a fan-like dial plate 7*a*, the time graduation 12*b* as the pointing graduation, and the like. Note that, the arrangement is not limited to the 8 o'clock position, and the power reserve display unit 50*a* may be provided at a position of another corresponding time graduation depending on a design.

The bezel 21 is an annular rotary bezel surrounding the dial 10, and numbers indicating elapsed time are engraved on a surface thereof. The bezel 21 includes a reverse-rotation prevention mechanism (not illustrated) that prevents clockwise rotation.

The crown 30 is a winding knob provided on the 3 o'clock position side in the case body 20, and is formed of a material similar to that of the case body 20.

Configuration of Power Reserve Display Unit

Figure 2:
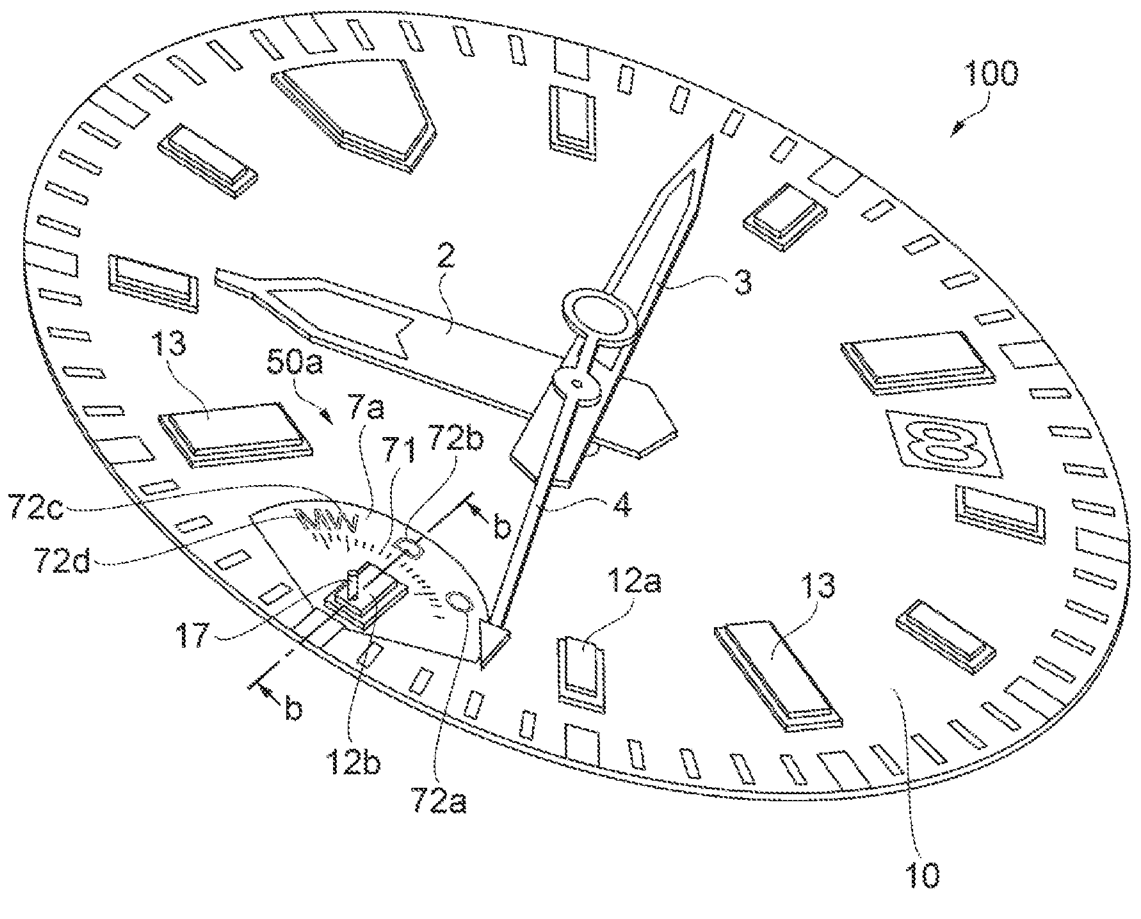
FIG. 2 is a perspective view of a periphery of a dial.
Figure 3:
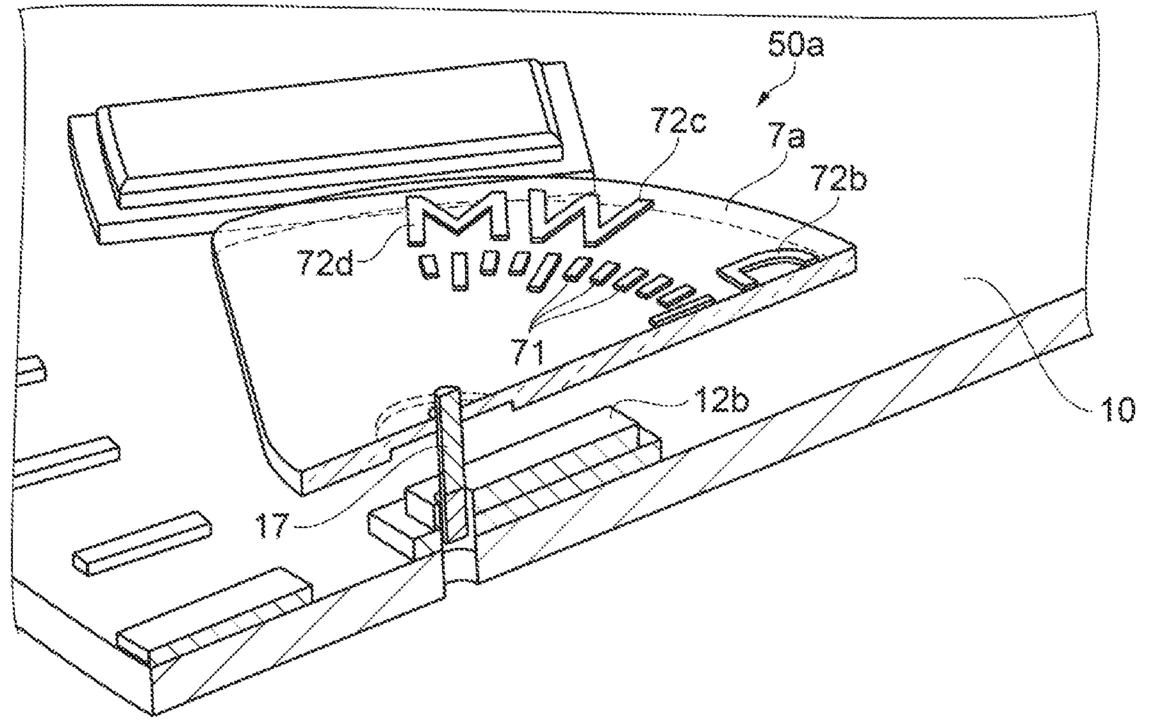
FIG. 3 is a perspective cross-sectional view of a power reserve display unit.

FIG. 2 is a perspective view of a periphery of the dial. FIG. 3 is a cross-sectional view taken along a line b-b in FIG. 2, and illustrates a cross-sectional configuration of the power reserve display unit.

Here, the configuration of the power reserve display unit 50*a* will be described using FIG. 2 and FIG. 3.

As illustrated in FIG. 2, the power reserve display unit 50*a* includes the time graduation 12*b* as the pointing graduation, the dial plate 7*a* provided above the time graduation 12*b*, and the like. In other words, the time graduation 12*b* is provided between the dial 10 and the dial plate 7*a*.

The time graduation 12*b* is a type made of resin that is set on the dial 10. Note that, the time graduation 12*b* may be made of metal.

The dial plate 7*a* is a transmissive plate member planarly having a fan shape, and a surface thereof is provided with a graduation 71 indicating power reserve information, and a symbol 72. The dial plate 7*a* is formed of a transmissive resin such as polycarbonate or acrylic, for example, and the graduation 71 and the symbol 72 are formed by printing. As a printing method, for example, tampo printing, screen printing, ink jet printing, and the like can be used.

A rotary shaft 17 that rotates the dial plate 7*a* is mounted to a vicinity of a center of the fan shape of the dial plate 7*a*. The dial plate 7*a* rotates about the rotary shaft 17 in parallel with the dial 10.

The graduations of the dial plate 7*a* include a plurality of the graduations 71, a symbol 72*a* to a symbol 72*d*, and the like along a circular arc of the fan shape.

The Symbol 72*a* is "0" indicating that remaining energy is zero. The Symbol 72*b* is "D" indicating that remaining energy corresponds to about one day. The Symbol 72*c* is "W" indicating that remaining energy corresponds to about one week. The Symbol 72*c* is "M" indicating that remaining energy corresponds to about one month.

The dial plate 7*a* is provided above the time graduation 12*b*, and the remaining energy is shown by the graduation 71 at a part of the dial plate 7*a* overlapping with the time graduation 12*b* that is seen through and observed. For example, in the case of FIG. 2, the time graduation 12*b* overlaps with the time graduation 71 to which the symbol 72*b* of "D" is assigned, thus it can be seen that the remaining energy corresponds to about one day. Also, the hour hand 2, the minute hand 3, and the seconds hand 4 rotate above the dial plate 7*a*.

As illustrated in FIG. 3, the rotary shaft 17 of the dial plate 7*a* is provided so as to passing through the time graduation 12*b*. The rotary shaft 17 is mechanically joined to a train wheel mechanism of a movement (not illustrated) housed in a rear face of the dial 10, and is driven in accordance with the remaining energy.

In other words, the dial plate 7*a* is supported by the rotary shaft 17, and includes the graduation 71 for power reserve information as predetermined information different from time. Then, the dial plate 7*a* overlaps with the time graduation 12*b* as the pointing graduation, which is one of the time graduations, and the power reserve information is indicated by the graduation 71 at a part where the time graduation 12*b* and the dial plate 7*a* overlap. That is, the time graduation 12*b* supported by the dial 10 points a graduation of the dial plate 7*a* to show the predetermined information different from time.

As described above, according to the watch 100 of the present exemplary embodiment, the following advantages can be obtained.

The watch 100 includes the hour hand 2 and the minute hand 3, the dial 10 including the plurality of time graduations indicating time by being pointed by the hour hand 2 and the minute hand 3, and the dial plate 7*a* having the graduation 71 for the power reserve information as the predetermined information different from time, and supported by the rotary shaft 17, at least part of the dial plate 7*a* overlaps with the time graduation 12*b* as the pointing graduation, which is one of the time graduations, and the graduation 71 at a part where the time graduation 12*b* and the dial plate 7*a* overlap indicates the power reserve information. In other words, in plan view from a normal direction of the dial 10, the rotary shaft 17 overlaps with the time graduation 12*b* as the pointing graduation that is one of the time graduations.

With this, since the transmissive dial plate 7*a* is configured to overlap with the time graduation 12*b*, unlike an existing watch where an time graduation is absent due to presence of the power reserve display unit, the time graduation 12*b* can be visually recognized via the dial plate.

Thus, all the time graduations including the time graduation 12*b* can be recognized, and thus time is easily recognized. Accordingly, it is possible to provide the watch 100 that is provided with the power reserve display unit 50*a* and with which time is easily recognized.

Further, the time graduation 12*b* is provided between the dial 10 and the dial plate 7*a*, and the dial plate 7*a* is transmissive.

This makes it possible to recognize the time graduation 12*b* via the transmissive dial plate 7*a*.

Additionally, the rotary shaft 17 is provided so as to pass through the time graduation 12*b*, the dial plate 7*a* planarly has a fan shape, and the rotary shaft 17 is provided in the vicinity of the center of the fan shape.

With this, the power reserve information can be indicated by the graduation 71 of the dial plate 7*a* at the part overlapping with the time graduation 12*b*.

In addition, the time graduation 12*b* is planarly rectangular, and each of the other time graduation 12*a* and time graduation 13 also has the same shape as that of the time graduation 12*b*. Then, the time graduation 14 at the 12 o'clock position has a pentagonal shape, and has a larger size than that of the time graduation 13.

With this, the design concept can be satisfied without impairing a sense of unity in the design. Specifically, the most eye-catching time graduations 14 makes it easy to recognize the orientation of the watch 100, and by increasing the size of each of the time graduation 13 at the 6 o'clock position in the extension direction of 12 o'clock, and the time graduations 13 at the respective 3 o'clock and 9 o'clock positions in a direction intersecting the extension direction, time is easily recognized. These improve visibility of time in dark environments such as under water.

Furthermore, the predetermined information is the power reserve information, and the graduation 71 of the dial plate 7*a* is the graduation for indicating drivable time.

With this, it is possible to provide the watch 100 that is provided with the power reserve display unit 50*a* and with which time is easily recognized.

Exemplary Embodiment 2

Different Aspect of Power Reserve Display Unit—1

Figure 4:
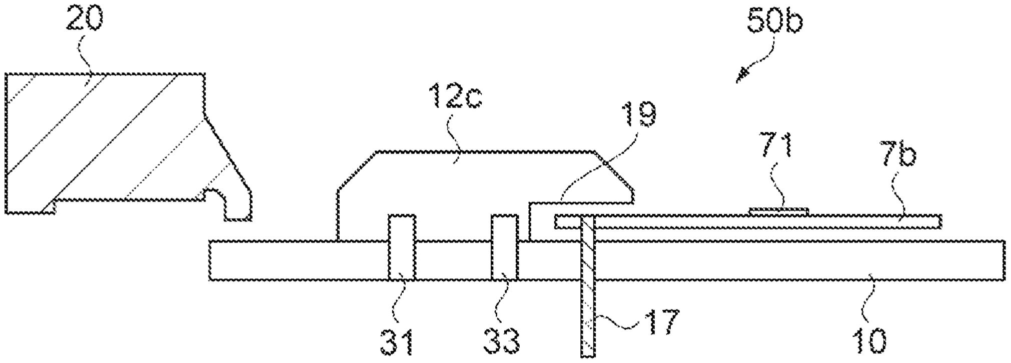
FIG. 4 is a cross-sectional view of a power reserve display unit according to Exemplary Embodiment 2.
Figure 5:
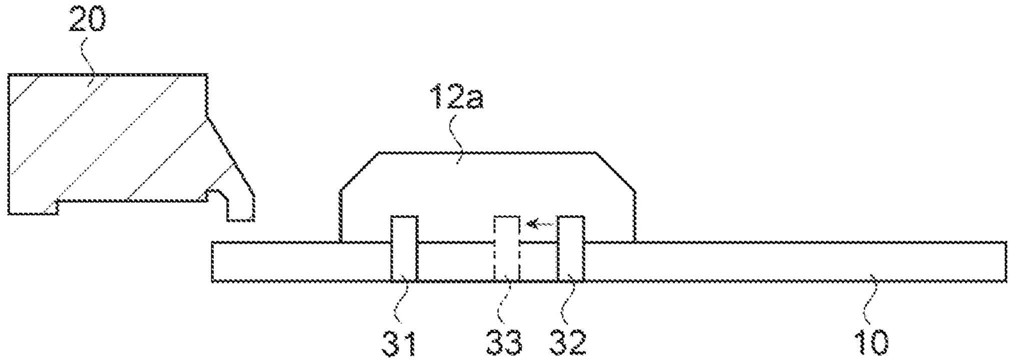
FIG. 5 is a cross-sectional view of an time graduation as a comparative example.

FIG. 4 is a cross-sectional view of a power reserve display unit according to the present exemplary embodiment, and corresponds to FIG. 3. FIG. 5 is a cross-sectional view of an time graduation at the 7 o'clock position, and corresponds to FIG. 4.

Here, a configuration of a power reserve display unit 50*b* of the present exemplary embodiment will be described referring mainly to FIG. 4, and to FIG. 5 and the like as appropriate.

In the power reserve display unit 50*b* of the present exemplary embodiment, a position of a dial plate 7*b* in a thickness direction is different from that of the dial plate 7*a* of Exemplary Embodiment 1. Specifically, the dial plate 7*b* is provided between the dial 10 and an time graduation 12*c* as a pointing graduation. Accordingly, a notch portion 19 for preventing interference with the dial plate 7*b* is provided at a lower part of the time graduation 12*c*. Hereinafter, the same constituents as those in Exemplary Embodiment 1 are given the same reference signs, and redundant description of these constituents will be omitted.

As illustrated in FIG. 4, the dial plate 7*b* is provided between the dial 10 and the time graduation 12*c*. The time graduation 12*c* is fixed to the dial 10 by a leg 31 and a leg 33 at respective two locations. In other words, the time graduation 12*c* is set to the dial 10 by the leg 31 and the leg 33 at the respective two locations. Here, as illustrated in a comparative view in FIG. 5, an interval between the leg 31 and the leg 33 in the time graduation 12*c* is shorter than an interval between the leg 31 and the leg 32 at respective two locations in another time graduation 12*a*. This is to provide the notch portion 19 for preventing interference with the dial plate 7*b* at the lower part of the time graduation 12*c*.

Note that, the notch portion 19 is formed at the lower part of the time graduation 12*c*, but an upper part is the same as that of the other time graduation 12*a*, and is visually observed in the same manner.

Further, since the time graduation 12*c* is not configured to be visually recognized through the dial plate 7*b*, a material of the dial plate 7*b* need not be a transparent member, and for example, a metal plate may be used, or a colored resin plate may be used. Additionally, the rotary shaft 17 overlaps with the time graduation 12*c*.

Figure 6:
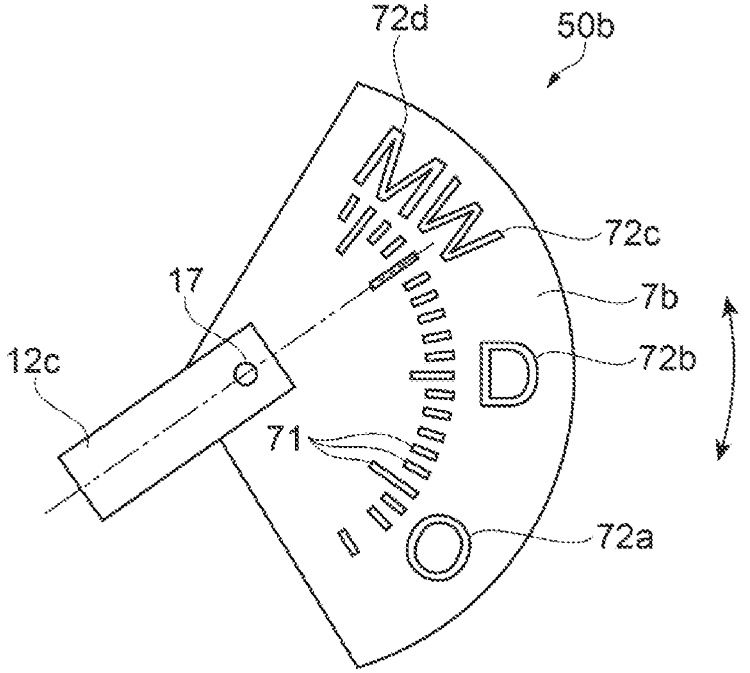
FIG. 6 is a plan view of the power reserve display unit.

FIG. 6 is a plan view of the power reserve display unit 50*b*, and corresponds to FIG. 1.

As illustrated in FIG. 6, according to the power reserve display unit 50*b*, power reserve information is indicated by the graduation 71 of the dial plate 7*b* in an extension direction of the time graduation 12*c*.

In the case of FIG. 6, the extension direction of the time graduation 12*c* points the graduation 71 to which the symbol 72*c* of "W" is assigned, thus it can be seen that remaining energy corresponds to about one week.

As described above, according to the watch 100 including the power reserve display unit 50*b* of the present exemplary embodiment, the following effects can be obtained in addition to the effects in Exemplary Embodiment 1.

The watch 100 includes the hour hand 2 and the minute hand 3, the dial 10 including the plurality of time graduations indicating time by being pointed by the hour hand 2 and the minute hand 3, and the dial plate 7*b* having the graduation 71 for the power reserve information as the predetermined information different from time, and supported by the rotary shaft 17, wherein in plan view from a normal direction of the dial 10, the rotary shaft 17 overlaps with the time graduation 12*c* as the pointing graduation, which is one of the time graduations, and the graduation 71 of the dial plate 7*b* in the extension direction of the time graduation 12*c* indicates the power reserve information.

With this, since the graduation 71 of the dial plate 7*b* in the extension direction of the time graduation 12*c* is configured to indicate the power reserve information, unlike an existing watch where an time graduation is absent due to presence of a power reserve display unit, the time graduation 12*c* can be recognized equivalently to the other time graduation 12*a*. Thus, all the time graduations including the time graduation 12*c* can be recognized, and thus time is easily recognized. Accordingly, it is possible to provide the watch 100 that is provided with the power reserve display unit 50*b* and with which time is easily recognized.

Additionally, the dial plate 7*b* is provided between the dial 10 and the time graduation 12*b*.

With this, since the dial plate 7*b* is located directly below the time graduation 12*b*, it is easy to recognize the graduation 71 of the dial plate 7*b* pointed by the time graduation 12*b*.

In addition, the time graduation 12*c* is fixed to the dial 10 by the leg 31 and the leg 33 at the respective two locations, and the interval between the leg 31 and the leg 33 at the respective two locations is shorter than the interval between the leg 31 and the leg 32 at respective two locations in the other time graduation 12*a*.

This makes it possible to ensure a space into which a part of the dial plate 7*b* slides below the time graduation 12*c*.

Exemplary Embodiment 3

Different Aspect of Power Reserve Display Unit—2

Figure 7:
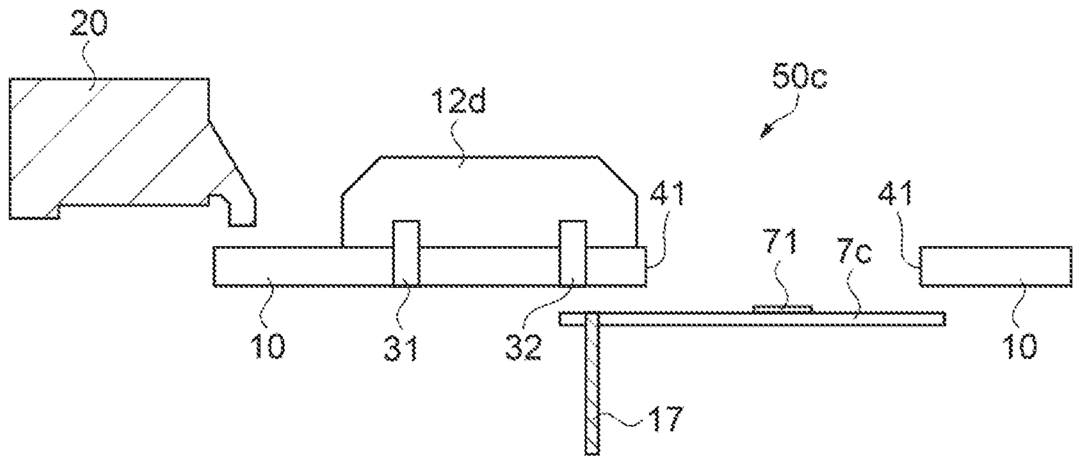
FIG. 7 is a cross-sectional view of a power reserve display unit according to Exemplary Embodiment 3.
Figure 8:
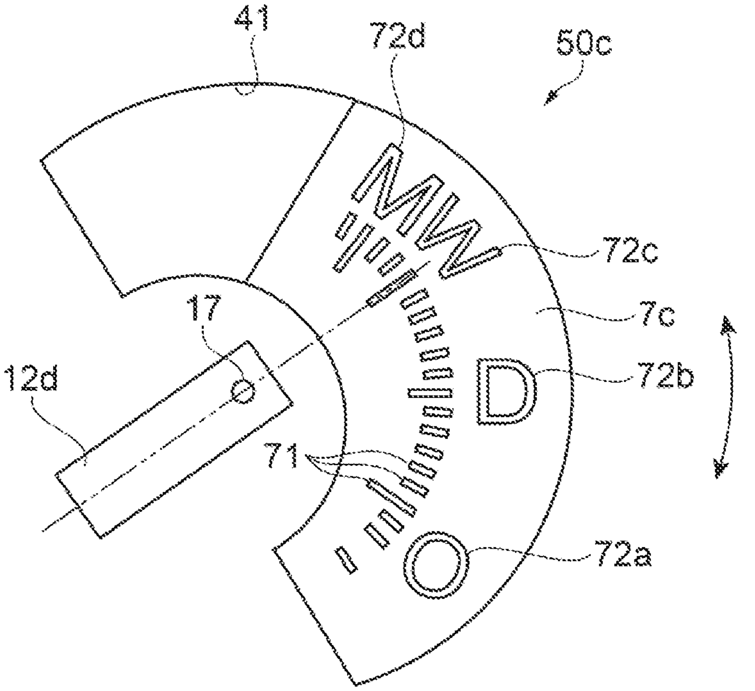
FIG. 8 is a plan view of the power reserve display unit.

FIG. 7 is a cross-sectional view of a power reserve display unit according to the present exemplary embodiment, and corresponds to FIG. 3 and FIG. 4. FIG. 8 is a plan view of a power reserve display unit 50*c*, and corresponds to FIG. 1 and FIG. 6. Here, a configuration of the power reserve display unit 50*c* of the present exemplary embodiment will be described referring mainly to FIG. 7, and to FIG. 8 and the like as appropriate.

In the power reserve display unit 50*c* of the present exemplary embodiment, an opening portion 41 is provided in the dial 10, and the dial plate 7*c* is configured to be exposed from the opening portion 41. Points other than the above are the same as those of the power reserve display unit 50*a* of Exemplary Embodiment 1. Hereinafter, the same constituents as those in Exemplary Embodiment 1 are given the same reference signs, and redundant description of these constituents will be omitted.

As illustrated in FIG. 7, the opening portion 41 is formed in the dial 10 in the present exemplary embodiment. The opening portion 41 is formed from a vicinity of an end portion of an time graduation 12*d* as a pointing graduation toward a center of the dial 10. A dial plate 7*c* is arranged below the dial 10. The rotary shaft 17 of the dial plate 7*c* is arranged at a position overlapping with the time graduation 12*d*.

As illustrated in FIG. 8, the opening portion 41 planarly has a substantially fan-shaped opening shape centered on the rotary shaft 17 on a rear face side of the time graduation 12*d*. Specifically, the shape of the opening portion 41 has a size such that the graduation 71 and the symbol 72 of the dial plate 7*c* are observable from the opening portion 41 in a rotational range of the dial plate 7*c*.

Furthermore, the time graduation 12*d* has the same configuration as that of another time graduation 12*a* (FIG. 5). The dial plate 7*c* need not be transmissive, and a material similar to that of the dial plate 7*b* of Exemplary Embodiment 2 can be used.

In other words, the power reserve display unit 50*c* is configured such that, the dial 10 has the opening portion 41, and the dial plate 7*c* is provided below the dial 10, and the graduation 71 and the symbol 72 of the dial plate 7*c* are exposed from the opening portion 41.

As illustrated in FIG. 8, according to the power reserve display unit 50*c*, power reserve information is indicated by the graduation 71 of the dial plate 7*c* in an extension direction of the time graduation 12*d*. In other words, the time graduation 12*d* supported by the dial 10 points the graduation 71 of the dial plate 7*c*.

In the case of FIG. 8, the extension direction of the time graduation 12*d* points the graduation 71 to which the symbol 72*c* of "W" is assigned, thus it can be seen that remaining energy corresponds to about one week.

As described above, according to the watch 100 including the power reserve display unit 50*c* of the present exemplary embodiment, the following effects can be obtained in addition to the effects in the above exemplary embodiment.

The watch 100 includes the hour hand 2 and the minute hand 3, the dial 10 including the plurality of time graduations indicating time by being pointed by the hour hand 2 and the minute hand 3, and the dial plate 7*c* having the graduation 71 for the power reserve information as the predetermined information different from time, and supported by the rotary shaft 17, wherein, the rotary shaft 17 overlaps with the time graduation 12*d* as the pointing graduation, which is one of the time graduations, and the graduation 71 of the dial plate 7*c* in the extension direction of the time graduation 12*d* indicates the power reserve information.

With this, since the graduation 71 of the dial plate 7*c* in the extension direction of the time graduation 12*d* is configured to indicate the power reserve information, unlike an existing watch where an time graduation is absent due to presence of a power reserve display unit, the time graduation 12*d* can be recognized equivalently to the other time graduation 12*a*. Thus, all the time graduations including the time graduation 12*d* can be recognized, and thus time is easily recognized. Accordingly, it is possible to provide the watch 100 that is provided with the power reserve display unit 50*c* and with which time is easily recognized.

In addition, according to the power reserve display unit 50*c*, a configuration is adopted such that, the dial 10 has the opening portion 41, the dial plate 7*c* is provided below the dial 10, and the graduation 71 and the symbol 72 of the dial plate 7*c* are exposed from the opening portion 41.

With this, the exposed portion is defined by the opening portion 41, and thus an outer shape of the dial plate 7*c*, and the rotary shaft 17 are hidden, and a design integrated with the dial 10 can be achieved.

Modification Example

Modification Example

Description will be given using FIG. 1.

In the above, the watch 100 has been described as including the bezel 21, but is not limited thereto, and may be configured without a bezel.

Further, the description has been given in which the time graduation 12 and the time graduation 13 have the different sizes, respectively, and the time graduation 12 and the time graduation 14 have the different shapes, respectively, but the present disclosure is not limited thereto, and may be changed in accordance with the design. For example, all the time graduations may be the same, or only the shape of the time graduation 14 may be different.

Additionally, although the predetermined information has been described to be the power reserve information, but is not limited thereto, may be a day of the week, or may be other information such as temperature or altitude.

Further, the time graduation 12*b* and the time graduation 12*a* have the same shape, but need not be completely the same. An end portion of the time graduation 12*b* on a center direction side of the dial may have an acute angle portion for further clarifying a pointing position of the dial plate 7*a*. Note that, the same shape here means a congruent geometric shape. Even with such a configuration, the same action and effect to those of the above exemplary embodiment may be obtained.

In FIG. 7 of Exemplary Embodiment 3, the dial 10 is configured to support an entire surface of the time graduation 12*d*, but is not limited thereto. An end face of the time graduation 12*d* on the dial plate 7*c* side may be configured to protrude toward the dial plate 7*c* side from an end face of the dial 10 on the dial plate 7*c* side. With this configuration, a relationship between the time graduation 12*d* and the graduation of the dial plate 7*c* becomes clearer, and thus visibility of an end portion of the time graduation 12*d* is improved. At this time, the leg 31 and the leg 32 of the time graduation 12*d* may be arranged differently from the other time graduations as illustrated in FIG. 4 and FIG. 5 of Example 2.

What is claimed is:

1. A watch comprising:

an hour hand and a minute hand;

a dial including a plurality of time graduations indicating time by being pointed by the hour hand and the minute hand; and a dial plate supported by a rotary shaft, the dial plate including graduations indicating predetermined information different from the time, wherein in plan view from a normal direction of the dial, the rotary shaft overlaps with a pointing graduation that is one of the time graduations, and the predetermined information is indicated by the graduation, of the dial plate, located in an extension direction of the pointing graduation.

2. The watch according to claim 1, wherein the pointing graduation is provided between the dial and the dial plate, and the dial plate is transmissive.

3. The watch according to claim 1, wherein the rotary shaft is provided so as to penetrate through the pointing graduation, the dial plate has a fan shape in plan view, and the rotary shaft is provided in a vicinity of a center of the fan shape.

4. The watch according to claim 1, wherein the dial plate is provided between the dial and the pointing graduation.

5. The watch according to claim 4, wherein the time graduations are fixed to the dial by first and second legs, and an interval between the first and second legs of the pointing graduation is shorter than intervals between the first and second legs of the time graduations other than the pointing graduation.

6. The watch according to claim 1, wherein the dial has an opening portion, the dial plate is provided below the dial, and the graduation of the dial plate is exposed from the opening portion.

7. The watch according to claim 1, wherein in plan view, the pointing graduation has a rectangular shape, and the time graduations other than the pointing graduation also have a shape similar to the shape of the pointing graduation.

8. The watch according to claim 1, wherein the predetermined information is power reserve information, and the graduation of the dial plate is an graduation indicating drivable time.

* * * * *